United States Patent [19]

Ohtani et al.

[11] 4,064,972
[45] Dec. 27, 1977

[54] CALIPER BRAKE FOR BICYCLES FOR MAINTAINING EQUAL DISTANCE BETWEEN BOTH BRAKE SHOES AND A WHEEL THEREBETWEEN

[75] Inventors: Kiyoshi Ohtani, Ageo; Kikuzo Takamiya, Kitamoto, both of Japan

[73] Assignee: Bridgestone Cycle Co. Ltd., Tokyo, Japan

[21] Appl. No.: 746,870

[22] Filed: Dec. 2, 1976

[30] Foreign Application Priority Data

July 12, 1976 Japan ................................. 51-81955

[51] Int. Cl.² .............................................. B62L 3/00
[52] U.S. Cl. ......................................... 188/24; 74/519; 188/27
[58] Field of Search ...................... 188/24, 25, 26, 27, 188/28, 29; 74/491, 519, 501 R, 489

[56] References Cited

U.S. PATENT DOCUMENTS

| 3,486,586 | 12/1969 | Grier, Jr. ................................. | 188/24 |
| 3,628,635 | 12/1971 | Yoshigai ............................... | 188/24 X |

FOREIGN PATENT DOCUMENTS

| 428,468 | 7/1967 | Switzerland ............................ | 188/24 |
| 1,093,809 | 12/1967 | United Kingdom ..................... | 188/24 |

Primary Examiner—George E. A. Halvosa
Assistant Examiner—Douglas C. Butler
Attorney, Agent, or Firm—Stevens, Davis, Miller & Mosher

[57] ABSTRACT

A caliper brake for a bicycle comprising left and right caliper arms rotatably fitted to a pivot shaft and having at their ends brake shoes adapted to be urged against a rim of a wheel of the bicycle, a rocking arm having a base portion pivotally mounted to a frame of the bicycle between the caliper arms on the pivot shaft in a semi-fixed condition, and the rocking arm having at its end a through-hole, opposite to which the left and right caliper arms have bottomed holes, respectively, and a universal joint lever having at its middle portion a middle protrusive ball portion and at both its ends end protrusive ball portions, respectively, the middle protrusive ball portion fitting in the through-hole of the rocking arm, those end protrusive ball portions fitting in the bottomed holes of the left and right caliper arms, respectively, whereby the extent of the free gaps between the left and right brake shoes and the rim are maintained substantially equal. Even if the free gaps become unequal, the normal condition having equal gaps can be automatically restored by subsequent braking operation.

11 Claims, 14 Drawing Figures

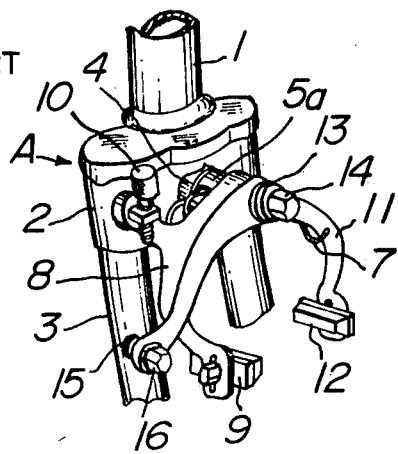
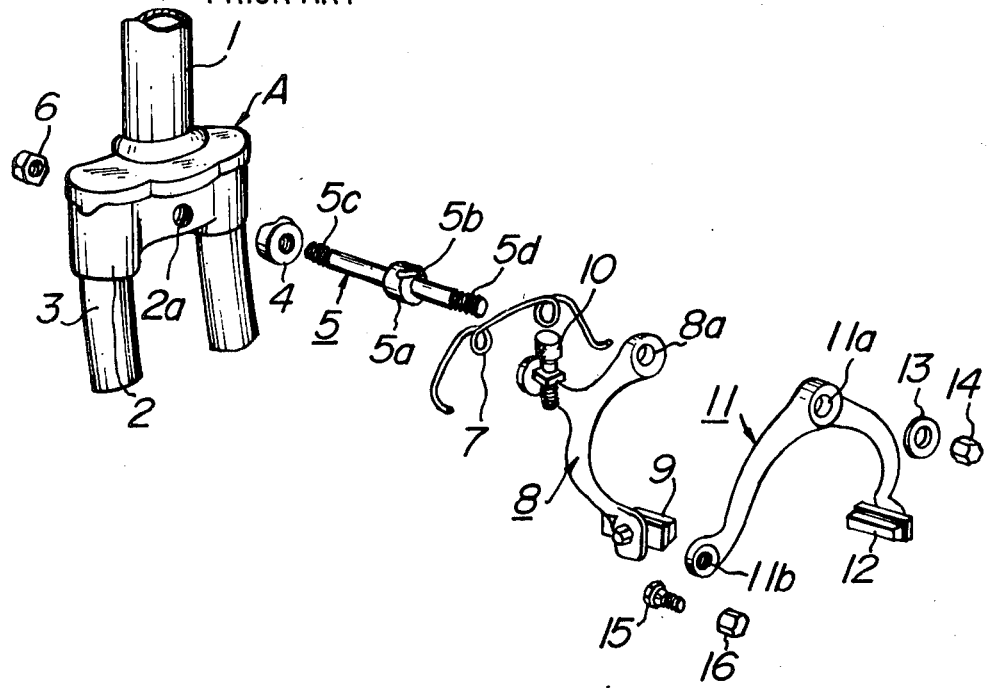

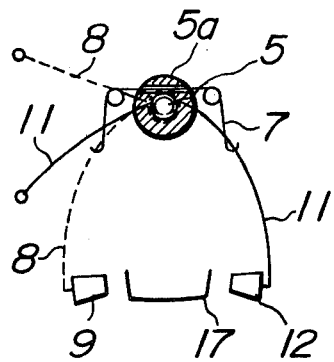
FIG_3a PRIOR ART
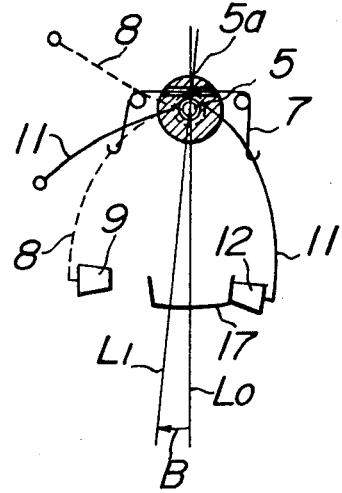
FIG_3b PRIOR ART
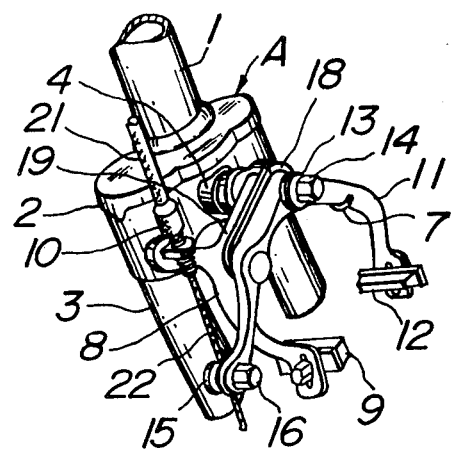
FIG_4

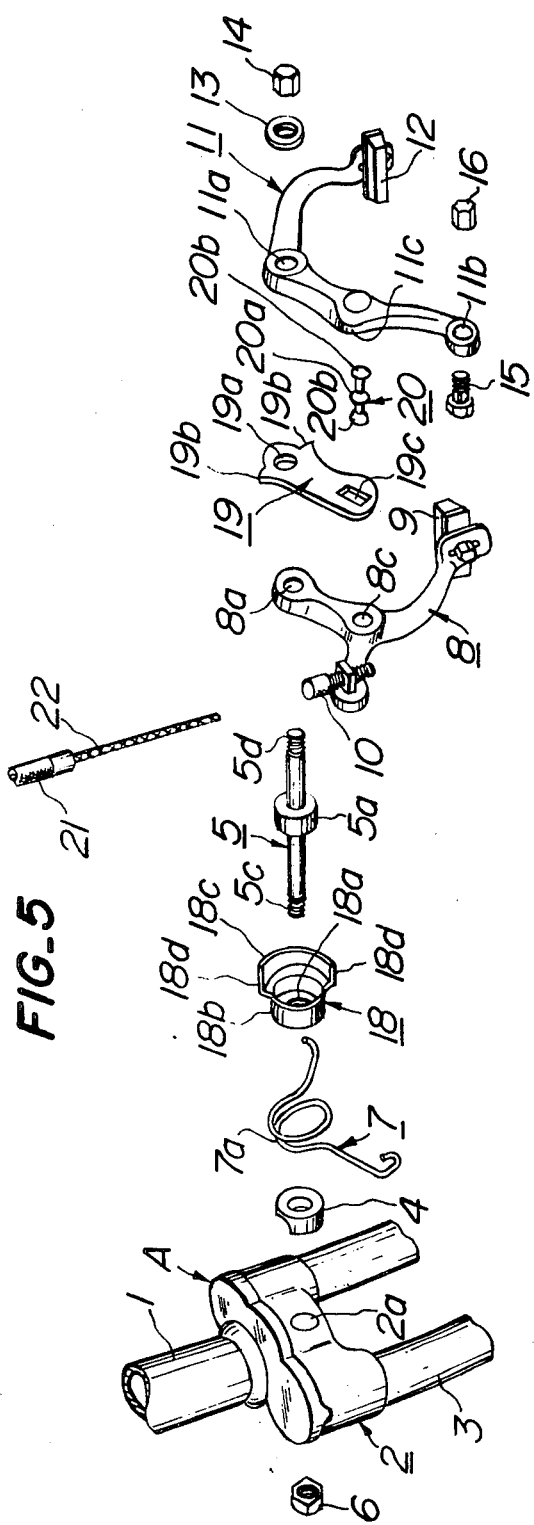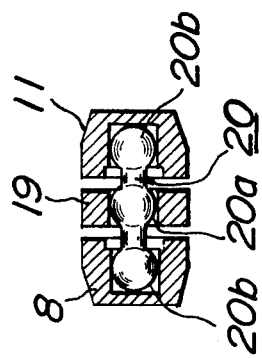

CALIPER BRAKE FOR BICYCLES FOR MAINTAINING EQUAL DISTANCE BETWEEN BOTH BRAKE SHOES AND A WHEEL THEREBETWEEN

BACKGROUND OF THE INVENTION

1. Field of the Invention

This invention relates to a caliper brake for a bicycle.

2. Description of the Prior Art

In general, a bicycle is driven only by human power and the human power is substantially smaller than other power sources, so that even if a friction pad of the brake is kept in slight contact with a rotary part of such a light vehicle, the lightness, or low momentum, peculiar to the bicycle movement is considerably deteriorated.

In the caliper brake of the prior art, one of the brake shoes frequently happens to contact a rim of a wheel of the bicycle. Accordingly, the above-mentioned low momentum peculiar to the bicycle is apt to be lost by such contact.

SUMMARY OF THE INVENTION

In order to overcome the above disadvantages in prior art caliper brakes, a caliper brake for use in a bicycle according to the present invention comprises left and right caliper arms rotatably fitted to a pivot shaft and having at their ends brake shoes adapted to be urged against a rim of a wheel of the bicycle, a rocking arm having a base portion pivotally mounted to a frame of the bicycle between said caliper arms on said pivot shaft in a semi-fixed condition, and the rocking arm having at its end a through-hole, opposite to which the left and right caliper arms have bottomed holes, respectively, and a universal joint lever having at its middle portion a middle protrusive ball portion and at both its ends end protrusive ball portions, respectively, said middle protrusive ball portion fitting in said through-hole of the rocking arm and said end protrusive ball portions fitting in said bottomed holes of the left and right caliper arms, respectively, whereby the extent of the free gaps between the left and right brake shoes and the rim are maintained substantially equal.

An object of the present invention is to provide an improved caliper brake for use in a bicycle so that the free gaps between the left and right brake shoes and the rim are always maintained equally.

The present invention will be more fully understood by referring to the following detailed specification and claims taken in connection with the accompanied drawings.

BRIEF DESCRIPTION OF THE DRAWINGS

FIG. 1 is a perspective view of a prior art caliper brake for a bicycle;

FIG. 2 is an exploded perspective view of the caliper brake shown in FIG. 1;

FIG. 3a is a diagrammatic sketch illustrating normal prior art free gaps between the brake shoes and the rim;

FIG. 3b is a diagrammatic sketch illustrating a condition in which one of the prior art brake shoes is in contact with the rim;

FIG. 4 is a perspective view of a caliper brake for a bicycle according to the present invention;

FIG. 5 is an exploded perspective view of the caliper brake as shown in FIG. 4;

FIG. 6 is a sectional view of the universal joint lever portion of the brake according to the invention when the brake is released;

FIG. 7 is a sectional view of the same universal joint lever portion during braking;

FIG. 8b is a sectional view of the universal joint lever portion of the brake corresponding to the condition illustrated in FIG. 8a;

FIG. 9b is a sectional view of the universal joint lever portion of the brake corresponding to the condition illustrated in FIG. 9a;

FIG. 10b is a sectional view of the universal joint lever portion of the brake corresponding to the condition illustrated in FIG. 10a.

DESCRIPTION OF THE PREFERRED EMBODIMENTS

Figure 8A:
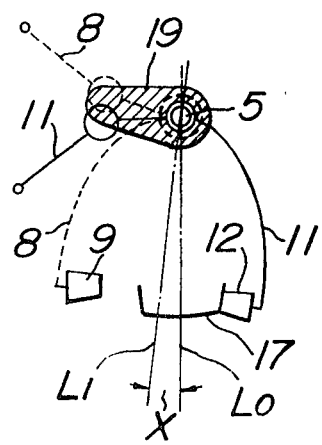
FIG. 8a is a diagrammatic view illustrating a condition in which one of the brake shoes of the brake according to the present invention is in contact with the rim.
Figure 8B:
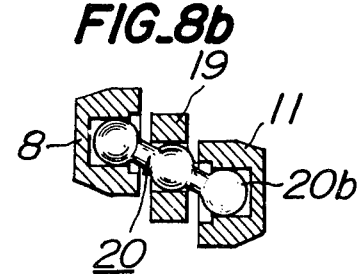

Referring to FIGS. 1, 2 and 3 showing a prior art caliper brake for a bicycle, a bicycle frame A has a front fork stem 1, a fork crown 2 and a front fork 3. The fork crown 2 has at its middle portion a through-hole 2a through the middle portion from the front to the rear of the fork crown 2. Reference numeral 4 denotes a base washer applied to the front of said through-hole 2a. A reference numeral 5 denotes a pivot shaft for supporting caliper arms 8 and 11 which will be mentioned hereinafter. The pivot shaft 5 has at its middle portion a collar 5a extending from the pivot shaft 5. The collar 5a has a spring inserting slot 5b machined horizontally on the upper front side of the collar 5a. The pivot shaft 5 also has at its rear end threads 5c and at its front end threads 5d. The threads 5c of the pivot shaft 5 are threaded into a nut 6 through the base washer 4 and the through-hole 2a to fix the pivot shaft 5 to the frame A. Into the spring inserting slot 5b is inserted a middle portion of a return spring 7. Reference numeral 8 denotes a right caliper arm having at its base portion an aperture 8a for inserting the pivot shaft 5 thereinto. A right brake shoe 9 is attached to the end of the arm 8. A wire guide 10 is attached to the middle portion of the arm 8. Reference numeral 11 denotes a left caliper arm having at its pivotal position an aperture 11a for inserting the pivot shaft 5 thereinto. A left brake shoe 12 is attached to the end of the arm 11. Reference numeral 13 denotes a washer through which the threads 5d of the pivot shaft 5 fit and reference numeral 14 is a nut for the threads 5d. The left caliper arm 11 has at its free end an aperture 11b into which a wire setting screw 15 is inserted. Reference numeral 16 denotes a nut connected thereto. Further, in FIG. 3, reference numeral 17 denotes a rim of a wheel of a bicycle.

In such a prior art caliper brake, the left and right caliper arms 8 and 11 are controlled by the balance type return spring 7 so that the brake shoes 9 and 12 are always disconnected equally from the rim 17, as shown in FIG. 3a. The action force of this spring 7, however, is not so strong, and therefore if the center line $L_1$ of the brake apparatus is for some reason shifted toward the direction of arrow B relative to the center line $L_0$ of the rim and is inclined as shown in FIG. 3b, only one side brake shoe 12 is always in contact with the rim 17. Such a phenomenon occurs frequently. In this case, since the correcting moment of the return spring 7 is very weak as mentioned above, it is very difficult for the brake to be restored to the normal state as shown in FIG. 3a, if once the one side contact between the brake shoe and the rim has occurred.

With this in mind, the present invention is intended to eliminate the disadvantages of the prior art caliper brake mentioned above.

An embodiment of the present invention will be explained hereinafter with reference to FIGS. 4 – 10, wherein the same reference numerals as those in FIGS. 1 – 3 denote like parts.

According to the present invention, a locking arm coupler 18 is fastened to the frame A in a semi-fixed condition through the base washer 4, pivot shaft 5 and nut 6. The locking arm coupler 18 has an integral ring-like base plate portion 18a to be inserted between the base washer 4 and the collar 5a of the pivot shaft 5, a small diameter cylinder portion 18b surrounding the collar 5a and a large diameter semi-cylinder portion 18c surrounding the boss portion of the right caliper arm 8. Further, a coil part 7a of the return spring 7 is fitted to the small diameter cylinder portion 18b of the coupler 18.

Between the right caliper arm 8 and the left caliper arm 11 is inserted a rocking arm 19 having at its base portion a hole 19a for inserting the pivot shaft 5, at its boss portion shoulders 19b extending outwardly, respectively, and at its end portion a through-hole 19c (preferably an elongated hole along the center line of the rocking arm). The shoulders 19b of the rocking arm 19 are engaged with edges 18d of the semi-cylinder portion 18c of the coupler 18, respectively, without substantial gap.

The right caliper arm 8 and the left caliper arm 11 have bottom holes 8c and 11c, respectively, which are opposite to the through-hole 19c of the rocking arm 19. On the other hand, there is provided a universal joint lever 20 having at its middle portion a middle protrusive ball portion 20a and at its both sides end protrusive ball portions 20b, respectively. Said middle protrusive ball portion 20a is inserted into the through-hole 19c of the rocking arm 19. Said end protrusive ball portions 20b are inserted into the bottomed holes 8c and 11c of the caliper arms 8 and 11, respectively. Further, in FIGS. 4 and 5, a reference numeral 21 denotes an outer wire connected to the wire guide 10, 22 and inner wire secured by the set screw 15.

Figure 9A:
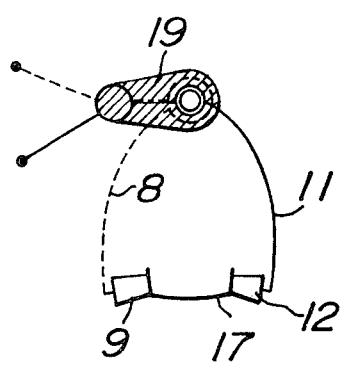
FIG. 9a is a diagrammatic view illustrating a braking condition of the brake according to the invention.
Figure 10A:
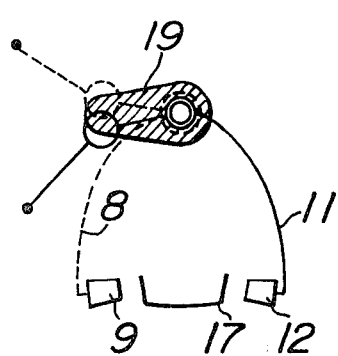
FIG. 10a is a diagrammatic view illustrating normal free gaps between the rim and the brake shoes of the brake according to the invention.

Operations of the thus constructed apparatus of the present invention will now be explained. In a normal condition of the caliper brake according to the present invention, the distance between the brake shoe 9 and the rim 17 is equal to that between the brake shoe 12 and the rim, as shown in FIG. 10a. In this situation the universal joint lever 20 resides in a condition as shown in FIG. 6. If a brake lever (not shown) of the bicycle is operated to pull the inner wire 22, then the right and left caliper arm 8 and 11 rotate in directions opposite to one another, so that the right and left brake shoes 9 and 12 are pushed against the respective sides of the rim 17, as shown in FIG. 9a and the braking is performed. Then, the universal joint lever 20 changes its condition from the condition shown in FIG. 6 to that in FIG. 7, but the rocking arm 19 does not change its position, since the rocking arm 19 is coupled to the frame A of the bicycle in a semi-fixed condition, i.e., it cannot move axially in the direction of the pivot shaft 5, being sandwiched between the caliper arms 8 and 11. The caliper arms 8 and 11 shift equally in opposite directions with respect to the rocking arm 19, since the universal joint lever 20 has at its middle portion the ball portion 20a and the end ball portions 20b are equidistant from the middle ball portion 20a. Consequently, in a normal condition, the braking can always be applied equally at both sides of the rim 17.

On the other hand, if the center line $L_1$ of the brake apparatus according to the present invention for some reason becomes inclined by an angle X, as shown in FIG. 8a, relative to the center line $L_0$ of the rim while the brake is released, then only the brake shoe 12 contacts the rim 17. If once the braking is applied under this condition, the brake shoe 12 remains as it is, while only the brake shoe 9 moves substantially to occupy a condition shown in FIG. 10a.

In this situation, the universal joint lever 20 works to change its condition from FIG. 8b to FIG. 9b. In other words, while the caliper arm 11 does not move, the universal joint lever 20 rocks, as shown by an arrow C in FIG. 9b, around the ball portion 20b at the right side in FIG. 9b, as a supporting point. As a result of this, the caliper arm 8 rotates significantly. The rocking arm 19 shifts by an amount equal to half of the shifting amount of the arm 8. The rocking arm 19 is supported by the coupler 18 which is supported on the frame A in a semi-fixed condition by the collar 5a of the pivot shaft 5 and the base washer 4. The rocking arm 19 can be moved when a large force is applied thereto.

Figure 9B:
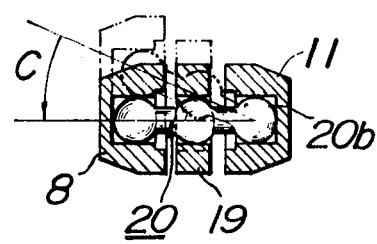
Figure 10B:
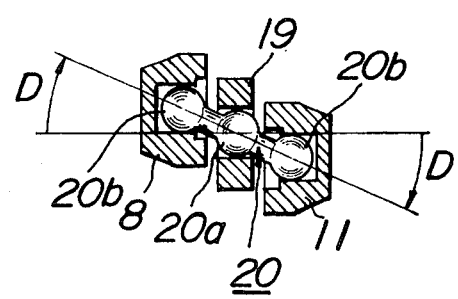

Next, when the brake is released under the condition shown in FIG. 9a, the rocking arm 19 does not move from the position shown in FIG. 9b, as shown in FIG. 10b, but the caliper arms 8 and 11 operate equally, as shown in FIG. 10a by means of the return spring 7, so that the brake shoes 9 and 12 are spaced equally from the rim 17. This is because the universal joint lever 20 rotates around the middle ball portion 20a thereof, as shown by arrows D in FIG. 10b, unless the rocking arm 19 moves, and the end ball portions 20b of the universal joint lever 20 are at an equal distance from the middle ball portion 20, so that the caliper arms 8 and 11 rotate equally toward opposite directions.

Thus, the caliper brake according to the present invention has a restoring operation and therefore is very advantageous. In more detail, even if the free gaps between the brake shoes and the rim become unequal for some reason, the normal condition in which the distances of the free gaps are equal can be automatically restored.

The caliper brake for a bicycle according to the present invention is very simple in construction, comprising the rocking arm coupler, the rocking arm and the universal joint lever in addition to the conventional caliper brake, as mentioned above, so that it is very easy to manufacture the caliper brake according to the present invention.

Furthermore, according to the present invention, the distance of the free gaps between the brake shoes and the rim can be always maintained equal, so that one-side braking can be prevented and reliable braking can be realized. In addition, the present invention has an advantageous effect in that the ease of the bicycle riding can be maintained by eliminating dragging of the brake shoe during bicycle operation.

What is claimed is:

1. a caliper brake for use on a bicycle, comprising:
    left and right caliper arms rotatably fitted to a pivot shaft and having at their ends brake shoes adapted to be urged against a rim of a wheel of a bicycle,
    a rocking arm having a base portion, for pivotally mounting to a frame of a bicycle, between said caliper arms on said pivot shaft in a semi-fixed condition, the rocking arm having at its end a through-hole, opposite to which the left and right caliper arms each have bottomed holes, and
    a universal joint lever having at its middle portion a midle protrusive ball portion and at each end an end protrusive ball portion, said middle protrusive ball portion fitting in said through-hole of the rocking arm and said end protrusive ball portions fitting in said bottom holes of the left and right caliper arms, respectively, for maintaining the distance of free gaps between left and right brake shoes and a bicycle wheel rim always substantially equal.

2. A caliper brake as claimed in claim 1, further comprising a rocking arm coupler for fastening to a bicycle frame by a collar on the pivot shaft and having a semi-cylinder portion edges of which are engaged to shoulders on a base portion of said rocking arm and projecting outwardly from the base portion, whereby the rocking arm may be mounted to a bicycle frame in a semi-fixed condition.

3. A caliper brake as claimed in claim 2, wherein said rocking arm has in its base portion a hole for inserting said pivot shaft.

4. A caliper brake as claimed in claim 3, wherein said rocking arm coupler further has a base portion facing with said collar of the pivot shaft and a cylinder portion surrounding said collar.

5. A caliper brake as claimed in claim 4, wherein said semi-cylinder portion of the rocking arm coupler surrounds a boss of a caliper arm which is inserted between the rocking arm coupler and the rocking arm.

6. A caliper brake as claimed in claim 4, wherein said semi-cylinder base and cylinder portions are integrally formed.

7. A caliper brake as claimed in claim 4, wherein a coil portion of a return spring is fitted to said cylinder portion of said rocking arm coupler.

8. A caliper brake as claimed in claim 1, wherein said through-hole is an elongated hole substantially along the center line of said rocking arm.

9. A caliper brake as claimed in claim 1 mounted on a bicycle, the base portion of said rocking arm being pivotally mounted to the frame of the bicycle.

10. A caliper brake as claimed in claim 9 wherein said rocking arm and the caliper arms are mounted on said pivot shaft which is attached to the frame of the bicycle.

11. A caliper brake for use on a bicycle or the like, comprising: a pivot shaft for attachment to the frame of a bicycle or the like, left and right caliper arms rotatably mounted on said shaft, said arms having brake shoes mounted on the respective ends thereof for being urged against a rim of a wheel of a bicycle or the like; a rocking arm, a base portion of which is pivotally mounted on said pivot shaft between said caliper arms in a semi-fixed fashion, the end of said rocking arm opposite its base portion having a hole therethrough adjacent to which each of the caliper arms also have bottomed holes; a universal lever joint having at its center a middle ball portion fitted in the hole in the rocking arm, and an end ball portion at each end of said lever, with one of said end ball portions located in each of the bottomed holes in the caliper arms; a collar on the pivot shaft upon which is located a rocking arm coupler having a semi-cylindrical portion, edges of which engage shoulder portions on the base of said rocking arm, and a base portion of said coupler axially facing said collar and a cylindrical portion of said coupler circumferentially around said collar; a return spring having a coil portion fitted to the cylindrical portion of said coupler with ends thereof biasing said caliper arms outward, said lever, rocking arm and caliper arms thus connected for properly reorienting the caliper brake structure upon contacting of only one brake shoe with a bicycle wheel rim.

* * * * *